(12) United States Patent
Kielczykowski et al.

(10) Patent No.: US 11,852,253 B2
(45) Date of Patent: Dec. 26, 2023

(54) SHUTTER VALVES

(71) Applicant: Goodrich Corporation, Charlotte, NC (US)

(72) Inventors: Piotr Kielczykowski, Ruda Milicka (PL); Przemyslaw Kielczykowski, Wrocław (PL)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/720,017

(22) Filed: Apr. 13, 2022

(65) Prior Publication Data

US 2022/0364654 A1 Nov. 17, 2022

(30) Foreign Application Priority Data

May 12, 2021 (EP) .................................... 21461539

(51) Int. Cl.
*F16K 15/02* (2006.01)
*F16K 11/044* (2006.01)
*F15B 13/02* (2006.01)

(52) U.S. Cl.
CPC .......... *F16K 15/021* (2013.01); *F16K 11/044* (2013.01); *F15B 13/028* (2013.01); *Y10T 137/2569* (2015.04)

(58) Field of Classification Search
CPC ......... Y10T 137/2567; Y10T 137/2569; F16K 11/044; F15B 13/028
See application file for complete search history.

(56) References Cited

U.S. PATENT DOCUMENTS

| 2,300,694 | A | | 11/1942 | Overbeke | |
|---|---|---|---|---|---|
| 2,408,799 | A | * | 10/1946 | Melichar | F17C 13/045 137/516.25 |
| 2,440,478 | A | | 4/1948 | Kehle | |
| 2,481,460 | A | | 9/1949 | Williams | |
| 2,583,539 | A | * | 1/1952 | Bashark | F16K 3/24 251/297 |
| 2,651,491 | A | | 9/1953 | Ashton et al. | |

(Continued)

FOREIGN PATENT DOCUMENTS

EP 3364047 8/2018

OTHER PUBLICATIONS

EPO, Extended Search Report dated Oct. 18, 2021 with EP Serial No. 21461593.5.

*Primary Examiner* — Robert K Arundale
(74) *Attorney, Agent, or Firm* — SNELL & WILMER L.L.P.

(57) ABSTRACT

A shuttle valve is disclosed. The shuttle valve comprises a valve body, a valve member, and a catch. The valve body comprises a first and a second fluid inlet, a central chamber, and a fluid outlet. The first and second fluid inlets and the fluid outlet open into the central chamber via a first and a second inlet mouth and an outlet mouth. The valve member is configured to move between a first and a second position, the valve member closes the first inlet mouth and allows fluid communication between the second inlet mouth and the outlet mouth when the valve member is in the first position, and the valve member closes the second inlet mouth and allows fluid communication between the first inlet mouth and the outlet mouth when the valve member is in the second position.

13 Claims, 4 Drawing Sheets

(56) References Cited

U.S. PATENT DOCUMENTS

| | | | | |
|---|---|---|---|---|
| 2,654,564 | A | * | 10/1953 | Pech ................... F16K 31/56 |
| | | | | 251/75 |
| 2,685,296 | A | * | 8/1954 | Boosman ............. F16K 11/044 |
| | | | | 251/156 |
| 2,729,226 | A | | 1/1956 | Jones |
| 2,900,166 | A | | 8/1959 | Boosman |
| 3,008,482 | A | * | 11/1961 | Hunter ................. F16K 11/056 |
| | | | | 251/75 |
| 3,760,859 | A | * | 9/1973 | Shahan .................. F16K 15/20 |
| | | | | 137/224 |
| 4,674,526 | A | | 6/1987 | Athanassiu |
| 6,296,008 | B1 | | 10/2001 | Boyer et al. |
| 10,190,696 | B2 | * | 1/2019 | Summers .............. F16K 11/056 |
| 11,396,067 | B2 | * | 7/2022 | Shinde ................. B23P 15/001 |
| 2018/0238471 | A1 | * | 8/2018 | Merrill ................... F16K 47/04 |
| 2022/0299122 | A1 | * | 9/2022 | Shetty .................... B64C 25/44 |

* cited by examiner

SHUTTER VALVES

CROSS-REFERENCE TO RELATED APPLICATIONS

This application claims priority to, and the benefit of, European Patent Application No. 21461539.5, filed May 12, 2021 and titled "SHUTTER VALVES," which is incorporated by reference herein in its entirety for all purposes.

FIELD

This disclosure relates to shuttle valves and the construction of such valves

BACKGROUND

Shuttle valves are a type of valve that is constructed to allow fluid from one of two different fluid sources to flow through and out of the valve via an outlet. The configuration of the valve and hence which of the two different fluids may flow through the valve is determined by the relative pressures of the two different fluids in that the fluid with the higher pressure will flow through the valve. Reconfiguration of the valve to change the fluid that flow through the valve occurs when the fluid flowing through the valve ceases to have a higher pressure than the fluid not flowing through the valve.

SUMMARY

According to a first aspect of this disclosure there is provided a shuttle valve comprising a valve body, a valve member, and a catch. The valve body comprises first and second fluid inlets, a central chamber, and a fluid outlet. The first and second fluid inlets and the fluid outlet open into the central chamber via first and second inlet mouths and an outlet mouth. The valve member is configured to move between first and second positions in which the valve member closes the first inlet mouth and allows fluid communication between the second inlet mouth and the outlet mouth when the valve member is in the first position, and the valve member closes the second inlet mouth and allows fluid communication between the first inlet mouth and the outlet mouth when the valve member is in the second position. The catch exerts a biasing force against the valve member, and the valve member and catch are so configured that the catch biasing force biases the valve member to close the first inlet mouth when the valve member is in the first position and to close the second inlet mouth when the valve member is in the second position.

In some embodiments the closure of the first or second inlet mouths is achieved by the valve member abutting a portion of the valve body that surrounds and defines the first or second inlet mouths. In some embodiments the abutted portion of the valve body may be spaced from the first or second inlet mouth. In some embodiments the valve member may partially enter the first or second inlet mouth and abut the edge of the valve body that defines the first or second inlet mouth.

The first and second fluid inlets and the outlet of the shuttle valve are configured to engage with conduits through which fluid may flow. The shuttle valve and those conduits may form a part of a hydraulic or pneumatic system, for example a hydraulic or pneumatic system on an aircraft. The shuttle valve of the present disclosure may be used in all types of hydraulic or pneumatic systems.

In an embodiment of any of the above embodiments the biasing of the valve member by the catch contributes to the formation of a fluid tight seal between the valve member and the inlet mouth against which the valve member is biased. Another contributor to the formation of the fluid tight seal is the pressure difference between the fluids in the first and second inlets.

In some embodiments the fluid tight seal is created by forming the surfaces of the valve member and the surface or part of the valve body that the valve member abuts so that biasing of the valve member against the surface or part of the valve body that the valve member abuts creates a fluid tight seal. This typically involves machining the surfaces sufficiently accurately that contact between the surfaces is continuous at a sufficiently small scale for there to be no leakage between the surfaces.

In some embodiments, the portion of the valve member that contacts the valve body may have a surface that is part of a right circular cone, the mouth of the first or second inlet that the valve member is to close is circular in a plane perpendicular to the axis of that cone, and the partial insertion of the conical surface into the mouth of the inlet causes the conical surface to abut the whole of the edge defining the mouth and to form a seal there between. In some embodiments, the mouth of the inlet can be surrounded by a conical surface, that conical surface may have the same cone angle as the conical surface of the valve member, or in alternative embodiments, the cone angles of the respective surfaces may be different. The cone angle is to be understood to be the angle at which diametrically opposite sides of the cone would meet at the apex of the cone if present.

The use of conical seal faces abutting a second conical face or an edge defining a circular mouth or aperture is advantageous because the manufacture of such surfaces to a high degree of accuracy is readily achievable. Further, the relative accuracy of dimension between such elements allows the separate manufacturing of such parts. Further, any dimensional variation as a result of temperature induced expansion or contraction does not lead to failure of the seal.

Such embodiments are advantageous because no seal elements, for example elastomeric seal rings or the like, are required. This is advantageous because some hydraulic systems employ fluids that may be damaging to the materials from which seal elements are manufactured. Not including such seal elements lessens the maintenance requirements for the shuttle valve and decreases the risk of valve failure.

In other embodiments, a number of seal elements between the valve member and the surfaces or parts of the valve body that the valve member abuts may be included in the valve of the present disclosure.

It is to be understood that in the context of this disclosure, fluid tight, sealed or similar wording means a level of fluid tightness or sealing that falls within the design parameters of the shuttle valve.

In an embodiment of any of the above embodiments the valve member comprises first and second valve member push faces and the catch comprises first and second catch push faces. The first and second valve member push faces intersect each other at a valve member intersection, and the first and second catch push faces intersect each other at a catch intersection. The valve member is so configured that when the valve member is in or close to the first position the first catch push face is in contact with the first valve member push face and the biasing force from the catch is transmitted between the first catch push face and the first valve member push face. When the valve member is in or close to the second position the second catch push face is in contact with the second valve member push face and the biasing force from the catch is transmitted between the second catch push face and the second valve member push face.

An advantage of this feature of the disclosure is that the same catch member applies biasing force in two directions: toward the first inlet mouth, and toward the second inlet mouth. This increases the simplicity of the shuttle valve, and lessens the number of parts in the shuttle valve which provides economic and weight advantages.

In some embodiments, movement of the valve member between the first and second positions is movement backwards and forwards in a linear direction of travel. In such embodiments the valve member push faces and catch push faces may have a lateral dimension which is substantially perpendicular to that direction of travel, and a second dimension which is perpendicular to the first lateral dimension and, in a plane which includes the direction of travel, angled to that direction at an angle of between 0 and 90 degrees to the direction. In other embodiments, the angle between the second dimension and the direction of travel may be between 10 and 80 degrees, 20 and 70 degrees, 30 and 60 degrees, or 40 and 50 degrees.

In some embodiments, the surface of one or more of the push faces may be flat and the angle of the second dimension to the direction of travel will be constant for each push face. In other embodiments one or more of the catch push faces and/or valve member push faces may be curved or consist of a number of planar elements with the result that the angle between the second dimension of the push faces and the direction of travel of the valve member will be different at different positions on those push faces.

In an embodiment of any of the above embodiments the valve member intersection and catch intersection are so configured that it is probable that the biasing of the catch intersection against the valve member intersection will cause movement of the valve member towards one of the first or second inlet mouths.

In an embodiment of any of the above embodiments the surface profile of the portion of the catch comprising the first and second catch push faces and the catch intersection has, in the direction of movement of the valve member between the first and second positions, the form of one of a V, an inverted V, a U, or an inverted U, and the surface profile of the portion of the valve member comprising the first and second valve member push faces and the valve member intersection has, in the direction of movement of the valve member between the first and second positions, the form of the other of a V, an inverted V, a U, or an inverted U.

In other embodiments, the surface profile of one or both of the portion of the catch comprising the first and second catch push faces and the catch intersection and/or the portion of the valve member comprising the first and second valve member push faces and the valve member intersection has, in the direction of movement of the valve member between the first and second positions, the form of a V, an inverted V, a U, an inverted U a V or inverted V where the intersection of the arms of the V is rounded, the peak or trough of a sine wave, or a profile similar to a peak or trough of a sine wave.

In an embodiment of any of the above embodiments the catch comprises a biasing means and a pressure ring, and the pressure ring is configured to be biased against the valve member. In some embodiments the biasing means is a spring. In some embodiments a helical compression spring.

In an embodiment of any of the above embodiments the catch further comprises an internal circlip, the internal circlip and biasing means are located within the outlet, the biasing means is between the pressure ring and the circlip, the catch is so configured that a portion of the pressure ring extends out of the outlet mouth into the central chamber when the biasing means is in an unenergized condition. In this embodiment, the portion of the surface of the valve body defining the outlet includes a groove which may receive the circlip. In embodiments where the outlet is cylindrical the groove is circumferential. The circlip provides an element upstanding from the surface that defines the outlet against which the end of the biasing means remote from the pressure ring may react.

In an embodiment of any of the above embodiments the biasing means and pressure ring are so configured that they do not block flow of liquid out of the central chamber via the outlet.

The location of the catch in the outlet and use of a circlip to provide an upstanding element for the basing means to react against is advantageous because it allows easy servicing of the elements of the catch if the circlip is removed, and it minimizes the number of apertures that lead into the central chamber.

In an embodiment of any of the above embodiments the central chamber is longitudinally extending with a longitudinal central axis, the central chamber is defined by a number of longitudinally extending side walls, a first end wall and a second end wall. The first end wall defines the first inlet mouth, the second end wall defines the second inlet mouth, and a number of the side walls define the outlet mouth. The outlet mouth is spaced from the first and second end walls, and each portion of side wall is, in the longitudinal direction, substantially parallel to the portion of side wall that is on the diametrically opposite side of the longitudinal axis. The valve member further comprises a first and second sealing face and a first and second slide portion, in which the first and second sealing faces are so configured that when biased against the first and second inlet mouths respectively the first and second sealing faces form a fluid tight seal with the portion of the first and second end walls defining or adjacent to the first and second inlet mouths. The first and second slide portions are so configured that they slidingly engage with a portion of at least one side wall when the valve member is at or between the first and second positions.

In an embodiment of any of the above embodiments the first and second slide portions of the valve member extend around the valve member, the first slide portion is in full sliding and sealing contact with each side wall of the central chamber in the portion of the side wall between the outlet mouth and the first end wall when the valve member is in its first position, and the second slide portion is in full sliding and sealing contact with each side wall of the central chamber in the portion of the side wall between the outlet mouth and the second end wall when the valve member is in its second position.

Full sliding and sealing contact is to be understood to be in at least partial contact with the side wall along the whole circumferential length of the first or second sliding portion. The full sliding and sealing contact has the result that when the first or second seal face of the valve member is not closing the first or second inlet mouth, a fluid pressure differential across the first or second slide portions may be maintained. Again, it is advantageous that the sliding and sealing contact does not include any elastomeric sealing elements because of the potential corrosive nature of fluids passing through the shuttle valve.

In an embodiment of any of the above embodiments the first and second end walls are conical and the first and second ends of the valve member are conical, and the first and second end walls and first and second ends of the valve member are configured to form a fluid tight seal between them when biased into each other.

In some embodiments of the above embodiment, the cone angle of the first end wall is different to the cone angle of the first sealing face, and the cone angle of the second end wall is different to the cone angle of the second sealing face.

In an embodiment of any of the above embodiments the valve body comprises a base part and an insert, in which the base part defines the first inlet, the outlet, the first end wall, the number of sidewalls of the central chamber, and a receiver; the insert defines the second inlet and the second end wall of the chamber; the insert is dimensioned and configured to be received in the receiver; and the receiver is dimensioned to allow the valve member to be placed into or removed from the central chamber when the insert is not within the receiver. The base part and receiver may be so configured that insertion of the insert into the receiver creates a fluid tight seal between the insert and the receiver.

In an embodiment of any of the above embodiments the receiver is a continuation of the central chamber and the/ each side wall that defines the central chamber extends into and defines the receiver.

In an embodiment of any of the above embodiments one or more of the valve body or part thereof, valve member, and the catch or part thereof are formed from one or a combination of a corrosion resistant steel or other metallic or non-metallic material that is resistant to hydraulic fluids.

According to a second aspect of the disclosure there is provided a hydraulic system for an aircraft comprising at least one shuttle valve according to the above aspect of the disclosure.

BRIEF DESCRIPTION OF THE DRAWINGS

The disclosure will be further described and explained by way of example and with reference to the accompanying figures in which.

DETAILED DESCRIPTION

Figure 1:
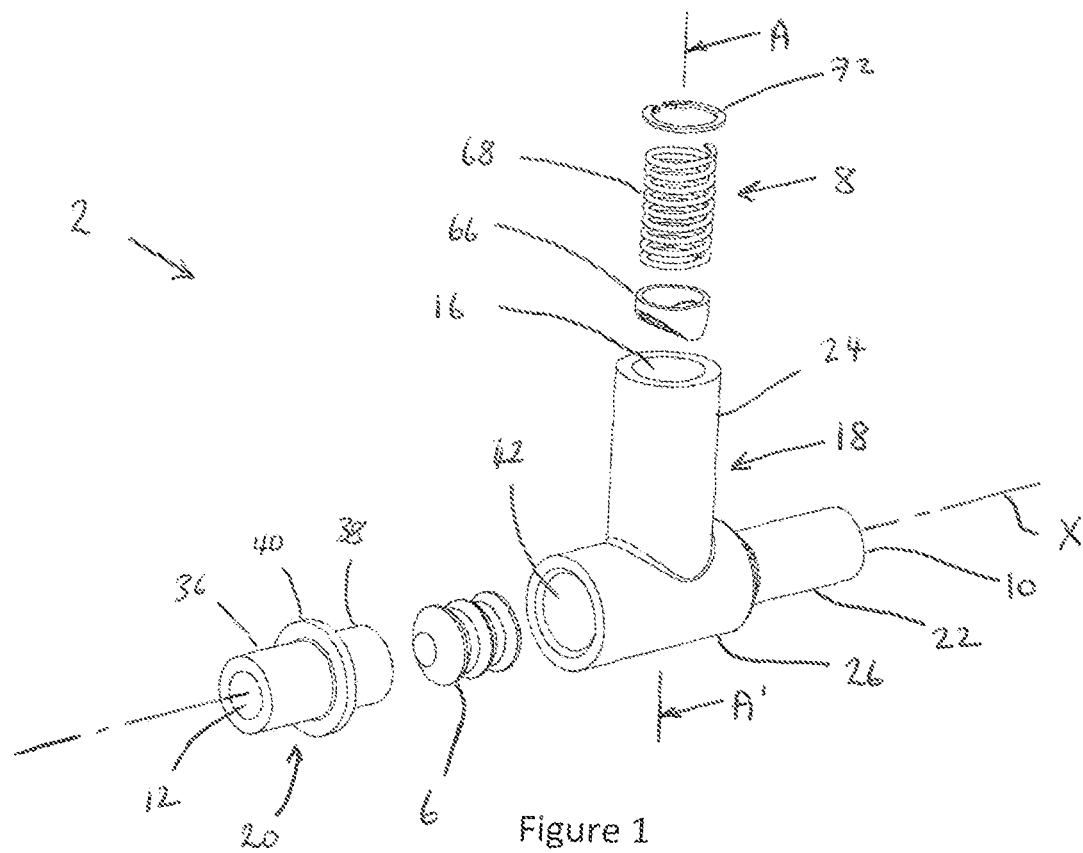
FIG. 1 shows an exploded schematic view of an example of a shuttle valve according to the present disclosure.
Figure 2:
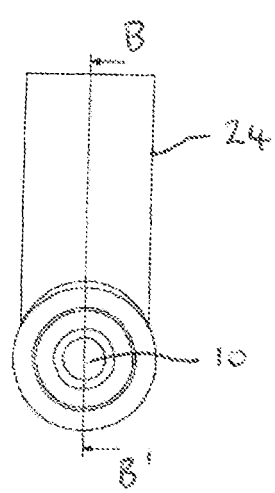
FIG. 2 shows an end view of the shuttle valve of FIG. 1.
Figure 3:
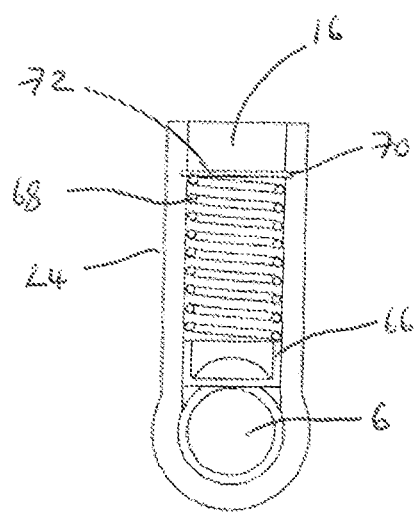
FIG. 3 shows a sectional end view along the line A-A' of the Shuttle valve of FIG. 1.
Figure 4:
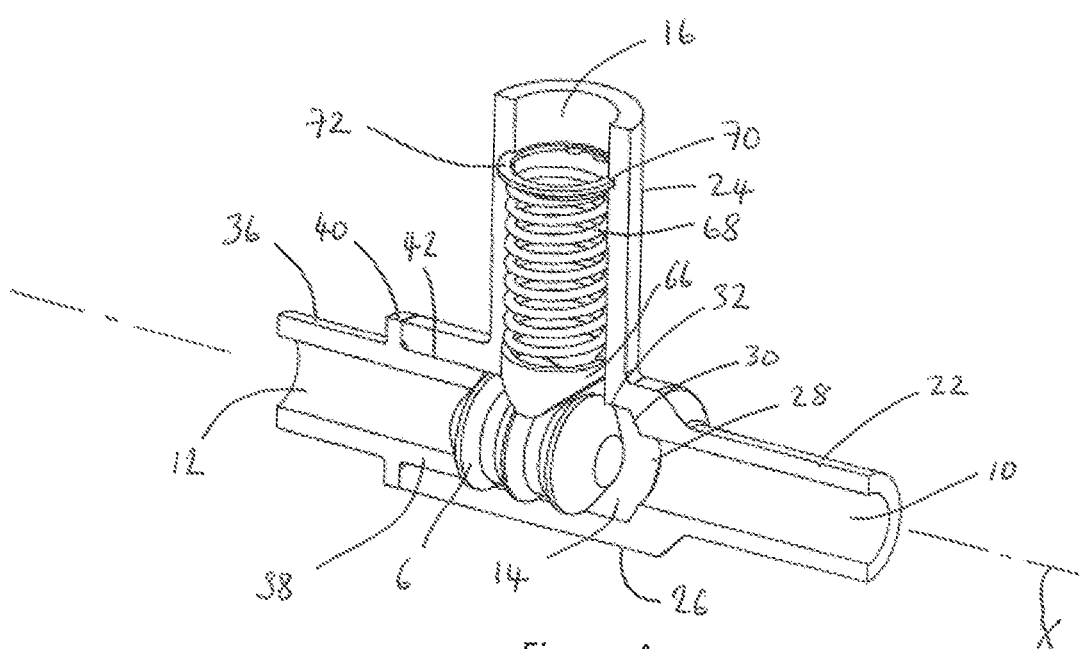
FIG. 4 shows a perspective sectional view along the line B-B' of the Shuttle valve of FIG. 1.

With reference to FIGS. 1 to 4, a shuttle valve 2 is comprised of a valve body 18, 20, a valve member 6, and a catch 8.

The valve body includes a base part 18 and an insert 20. The base part 18 includes an inlet portion 22, an outlet portion 24, and a chamber portion 26. The inlet portion 22 extends in the direction of the axis X and is adapted to engage with a first fluid inlet conduit (not shown). The inlet portion 22 defines a first inlet 10 which extends axially through the inlet portion 22 and opens into a central chamber 14 through a first inlet mouth 28. The first inlet mouth 28 is defined by a first end wall 30.

The chamber portion 26 of the base part 18 defines a central chamber 14 and receiver 42. The central chamber 14 and receiver 42 are both cylindrical, have a main axis X, and the longitudinally extending face of the chamber 14 is formed by a side wall 32. In the illustrated example of the present disclosure, the central chamber 14 and receiver 42 are of the same diameter and as such the side wall 32 extends the length of the central chamber 14 and receiver 42. In other, non-illustrated embodiments, the receiver 42 may have a larger diameter than the central chamber 14.

The outlet portion 24 of the base part 18 extends away from the axis X. The outlet portion 24 is adapted to engage with a fluid outlet conduit (not shown), and defines an outlet 16. Outlet 16 extends through the outlet portion 24 in a direction perpendicular to axis X and intersects the central chamber 14 through the side wall 32. The side wall 32 defines the outlet mouth.

The insert 20 of the valve body includes an inlet portion 36, an engagement portion 38 and a shoulder 40. The inlet portion 36 is adapted to be engaged with a second fluid inlet conduit (not shown). The engagement portion 38 is adapted to be removably inserted into the receiver 42 until the shoulder 40 of the insert 20 abuts the chamber portion 26 of the base part 18. The engagement portion 38 of the insert 20 is adapted to engage with the receiver 42 in a fluid tight fashion. In the illustrated example that engagement is a sliding fluid tight engagement. In some alternative embodiments, not shown, the receiver 42 and engagement portion 38 are both threaded and the engagement portion 38 can be screwed into the central chamber 14.

Figure 7:
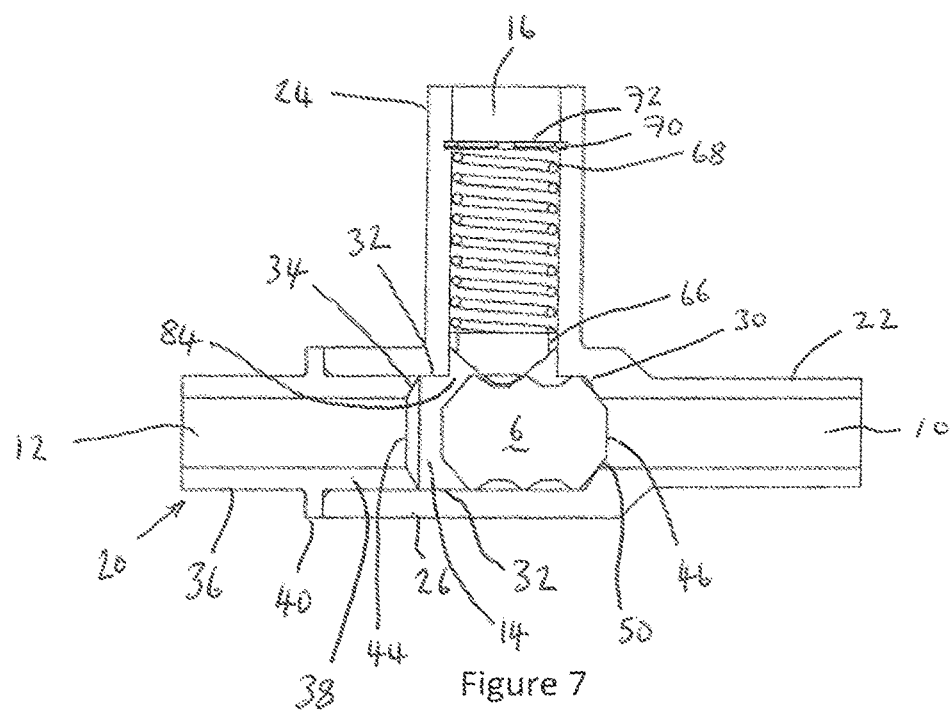
FIG. 7 shows a sectional view along the line B-B' of the Shuttle valve of FIG. 1 when the valve member is in the first position.

With reference to FIG. 7, the end of the engagement portion 38 of the insert 20 that is remote from the inlet portion 36 forms a second end wall 34 for the central chamber 14 and defines the second inlet mouth 44.

Figure 6A:
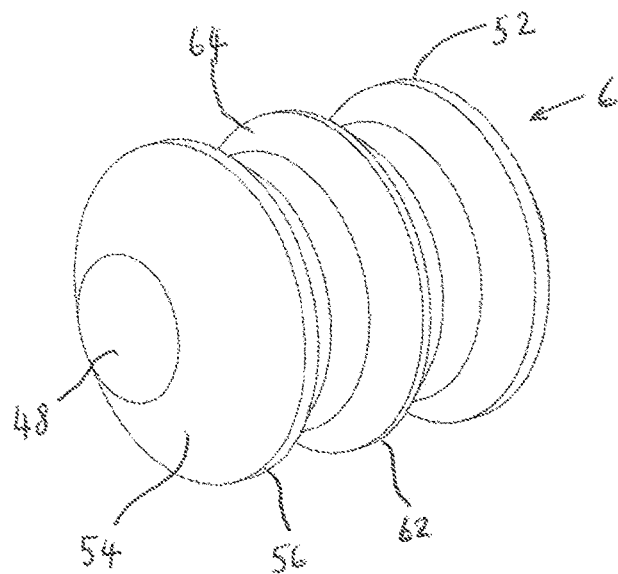
FIG. 6A shows an enlarged perspective view of the valve member of FIG. 1.
Figure 6B:
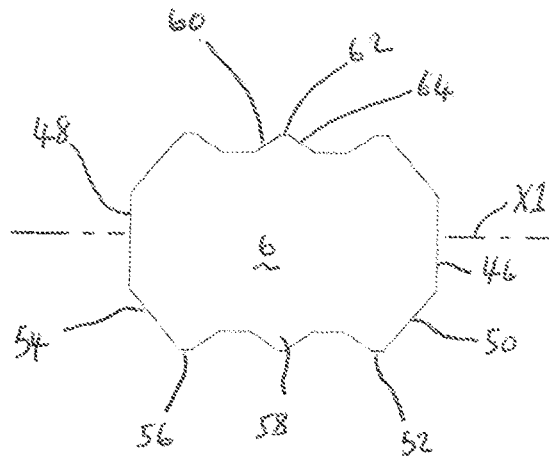
FIG. 6B shows a sectional view along the line B-B' of the valve member of FIG. 1.

With reference to FIGS. 6A and 6B, the valve member 6 is essentially cylindrical and with a central axis X1. The valve member 6 has a first end face 46 and a second end face 48 both of which are perpendicular to the central axis X1. Extending from the radially outer edge of first end face 46 is a conic first sealing face 50.

The first sealing face 50 extends radially outward from the first end face 46 and towards the second end face 48. The radially outer edge of the first sealing face 50 is also an edge of a first slide portion 52. The first slide portion 52 is parallel to the axis X1 and has a diameter that is such that when the valve member 6 is placed within the central chamber 14 the first slide portion 52 is in a sliding and sealing engagement with side face 32 of the central chamber 14 when the valve member is in its first position.

Extending from the radially outer edge of second end face 48 is a conic second sealing face 54.

The second sealing face 54 extends radially outward from the second end face 48 and towards the first end face 46. The radially outer edge of the second sealing face 54 is also an edge of a second slide portion 56. The second slide portion 56 is parallel to the axis X1 and has a diameter that is such that when the valve member 6 is within the central chamber 14, and the valve member 6 is in its second position, the second slide portion 56 is in a sliding and sealing engagement with side face 32 of the central chamber 14.

Midway between the first and second end faces 46, 48 of the valve member 6 is a protrusion 58. The protrusion 58 extends circumferentially around the valve member and is defined by a first valve member push face 60, a valve member intersection 62 and a second valve member push face 64. In the example of the valve member 6, as illustrated in the Figures, the diameter of the valve member intersection 62 is the same as that of the first and second slide portions 52, 56. In other non-illustrated examples, the diameter of the valve member intersection 62 may be less than that of the first and second slide portions 52, 56.

The valve member 6 may be placed into and removed from the central chamber 14 via the receiver 42 when the insert 20 is not engaged with the base part 18 of the valve body. When the valve member 6 is in the central chamber 14, the first and second sliding portions 52, 56 are in sliding contact with side wall 32 and axis X coincides with axis X1.

Figure 8:
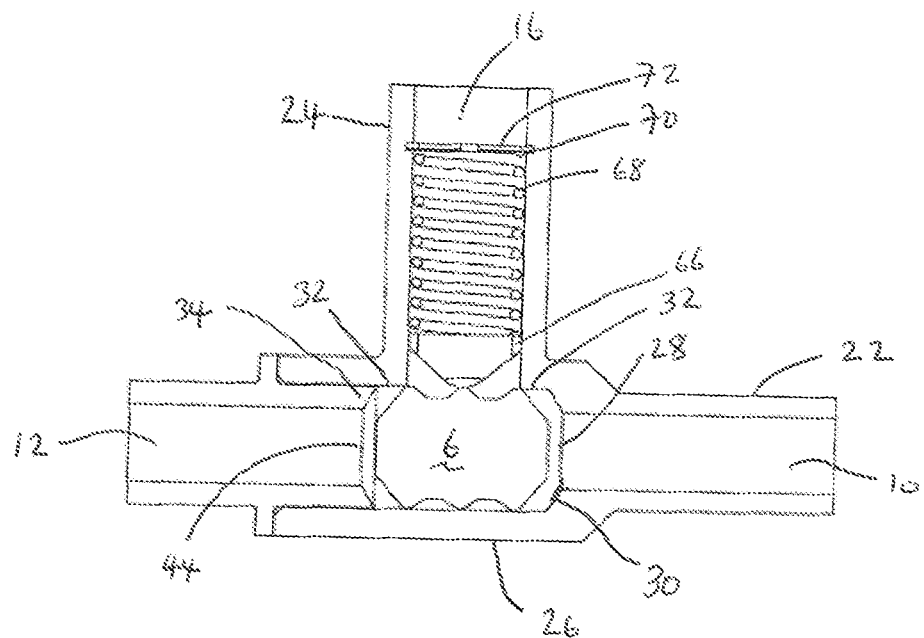
FIG. 8 shows a sectional view along the line B-B' of the Shuttle valve of FIG. 1 when the valve member is in between the first and second positions.

The valve member 6, central chamber 14 and the outlet mouth are longitudinally dimensioned so that when the valve member is midway between the first and second end walls 30, 34 the first sliding portion 52 is at least partially in sliding contact with the side wall 32 around the whole of the circumference of the first sliding portion 52, and the second sliding portion 56 is at least partially in sliding contact with the side wall 32 around the whole of the circumference of the second sliding portion 56. This is illustrated in FIG. 8 which is further described below.

The catch 8 is located within the outlet 16. The catch 8 is comprised of a pressure ring 66, a biasing means in the form of a helical compression spring 68, and a circlip 72 which is located in a groove 70. The groove 70 is in the surface of the outlet portion 24 that defines the outlet 16 and is circumferential. The circlip 72 is an internal circlip and may be reversibly placed into and removed from the groove 70.

The circlip 70 forms an upstanding element on the surface that defines the outlet 16 against which one end of the helical spring 68 may react. The other end of the helical spring abuts the push ring 66 and causes a portion of the push ring 66 to extend through the outlet mouth and into the central chamber 14.

Figure 5:
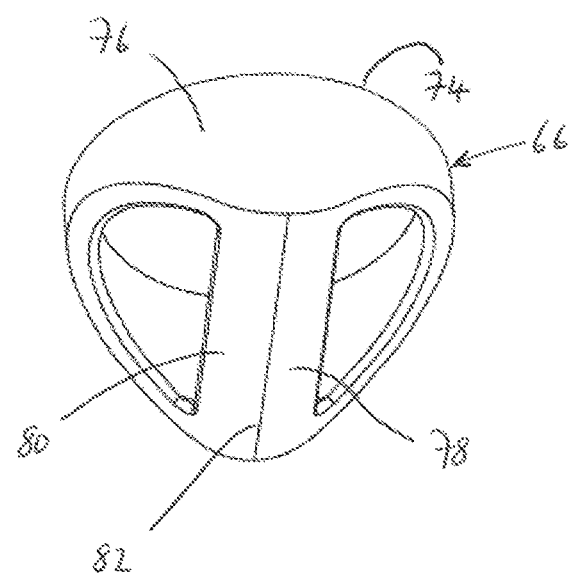
FIG. 5 shows an enlarged view of the pressure ring of FIG. 1.

With reference to FIG. 5, the push ring 66 is comprised of an abutting face 74 which is adapted to abut an end of the helical spring 68. The end of the helical spring 68 and push ring 66 may be so configured or provided with appropriate means that cause the push ring to be retained in a fixed or loosely fixed relationship with the end of the helical spring 68.

The push ring 66 further comprises a wall 76, a first catch push face 78 and a second catch push face 80. The first and second catch push faces 78, 80 intersect with each other at a catch intersection 82.

The push ring 66 is so dimensioned that the wall 76 is a sliding fit with the face of the outlet portion 24 that defines the outlet 16. The push ring 66 is also so configured that it offers a low impedance to the flow of fluid through the outlet 16 and between the central chamber 14 and outlet 16.

The helical spring 68 is dimensioned and/or the circlip 72 is so positioned that the helical spring 68 is under compression when the first or second catch push faces 78, 80 or the catch intersection 82 are in contact with the valve member 6.

With reference to FIG. 7, this Figure shows the shuttle valve 2 when the valve member 6 is in its first position. This position arises when the pressure of the fluid in second inlet 12, central chamber 14 and outlet 16 is greater than the pressure in the fluid in first inlet 10. The fluid in the second inlet 12, central chamber 14 and outlet 16 can flow in either direction (from the second inlet 12 to the outlet 16, or from the outlet 16 into the second inlet 12) dependent on other elements (not shown) of the hydraulic or pneumatic system of which the shuttle valve 2 is a part.

Fluid can flow between and through the second inlet 12, central chamber 14 and outlet 16 because the second slide portion 56 is not in full or partial contact with the side wall 32. That is the second slide portion 56 is not in contact with the side wall 32 along the whole of its circumferential length. The portion of the second slide portion 56 that is not in contact with the side wall 32 is the portion that is adjacent to the outlet mouth, and a passage 84 extends between the edge of the side wall 32 defining the outlet mouth and the second sealing face 54 which allows the flow of liquid between the central chamber 14 and outlet 16.

When the valve member 6 is in its first position, the first catch push face 78 is biased against first valve member push face 60 by the helical spring 68. The biasing force passes between the first catch push face 78 and first valve member push face 60 in a direction normal to the surfaces at the position they contact each other. Part of that force resolves into a force parallel to the X axis and pushes the first sealing face 50 against first end wall 30 creating a fluid tight seal between them.

With reference to FIG. 8, this figure shows the shuttle valve 2 when the valve member 6 is moving between its first and second positions. This position arises when the valve member 6 starts in its first position as shown in FIG. 7 and the pressure in the fluid in first inlet 10 rises to exceed the pressure of the fluid in the second inlet 12, central chamber 14 and outlet 16 by a predetermined amount. That predetermined amount is dependent on the spring force exerted by the helical spring 68. In this situation, when the fluid in the first inlet 10 achieves an internal pressure sufficient to overcome the biasing force exerted by the helical spring 68 the fluid in first inlet 10 starts to push the valve member 6 towards the second end face 34 of the central chamber 14. This causes the first valve member push face 60 to push on the first catch push face 78 and force the pressure ring 66 towards the circlip 72 so compressing the helical spring 68. The fluid in the first inlet 10 continues to push the valve member 6 towards the second end wall 34 after the seal between the first end wall 30 and first seal face 50 of the valve member 6 is broken because the first slide portion 52 is in sealing and sliding engagement with the side wall 32.

The valve member 6 continues to be pushed towards the second end wall 34 until the valve member 6 has been pushed sufficiently far that the catch intersection 82 is in contact with the valve member intersection 62 and the second slide portion 56 comes into sliding and sealing engagement with the side wall 32 around the whole of its circumference closing the passage 84.

Further movement of the valve member 6 towards the second end wall 34 causes the second catch push face 80 to come into contact with the second valve member push face 64. The basing force from the helical spring 68 decompressing and the fluid pressure from the fluid in first inlet 10, central chamber 14 and outlet 16 then impel the valve member 6 towards the second end wall 34 until the valve member reaches its second position (shown in FIG. 9), the second sealing face 54 contacts end wall 34, and a fluid tight seal is formed between those faces.

Figure 9:
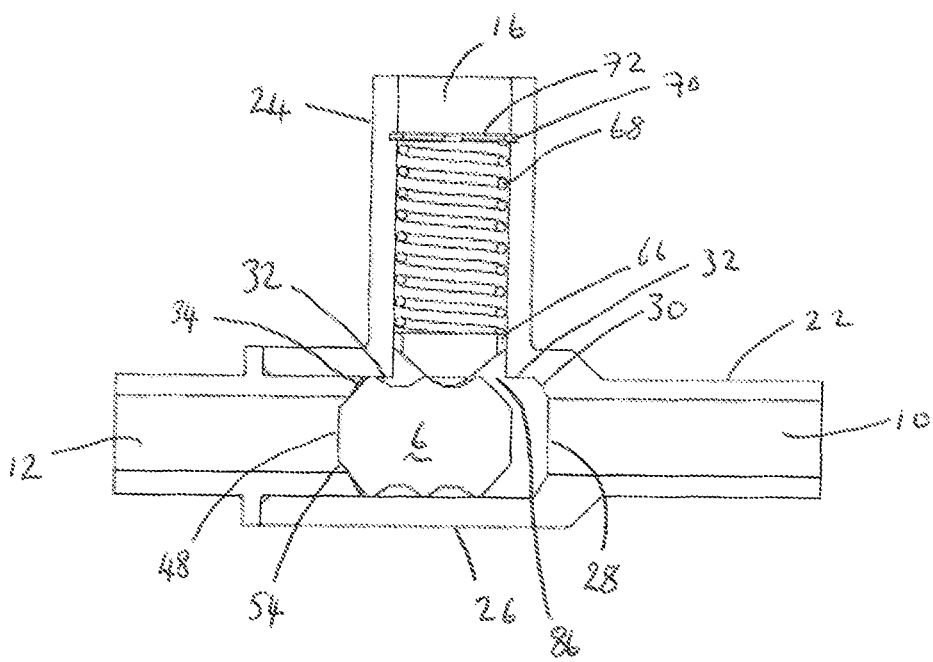
FIG. 9 shows a sectional view along the line B-B' of the Shuttle valve of FIG. 1 when the valve member is in the second position.

With reference to FIG. 9, when the valve member 6 is in the second position the fluid in the first inlet 10, central chamber 14 and outlet 16 can flow in either direction (from the first inlet 10 to the outlet 16, or from the outlet 16 into the first inlet 10) dependent on other elements (not shown) of the hydraulic or pneumatic system of which the shuttle valve 2 is a part. Fluid can flow between and through the first inlet 10, central chamber 14 and outlet 16 because the first slide portion 52 is not in contact with the side wall 32 around its whole circumference. The portion of the first slide portion 52 that is not in contact with the side wall 32 is the portion that is adjacent to the outlet mouth, and a passage 86 between the edge of the side wall 32 defining the outlet mouth and the first sealing face 52 allows the flow of liquid between the central chamber 14 and outlet 16.

The configuration of shuttle valve 2 as shown in FIG. 8 also arises when the valve member 6 is moving between its second and first positions. This position arises when the valve member 6 starts in its first position as shown in FIG. 9 and the pressure in the fluid in second inlet 12 rises to exceed the pressure of the fluid in the first inlet 10, central chamber 14 and outlet 16 by the predetermined amount. In this situation, when the fluid in the second inlet 12 achieves an internal pressure sufficient to overcome the biasing force exerted by the helical spring 68 the fluid in second inlet 12 starts to push the valve member 6 towards the first end face 30 of the central chamber 14. This causes the second valve member push face 64 to push on the second catch push face 80 and force the pressure ring 66 towards the circlip 72 so compressing the helical spring 68. The fluid in the second inlet 12 continues to push the valve member 6 towards the first end wall 30 after the seal between the second end wall 34 and second seal face 54 of the valve member 6 is broken because the second slide portion 56 is in sealing and sliding engagement with the side wall 32.

The valve member 6 continues to be pushed towards the first end wall 30 until the valve member 6 has been pushed sufficiently far that the catch intersection 82 is in contact with the valve member intersection 62 and the first slide portion 52 comes into sliding and sealing engagement with the side wall 32 around the whole of its circumference closing the passage 86.

Further movement of the valve member 6 towards the first end wall 30 causes the first catch push face 78 to come into contact with the first valve member push face 60. The basing force from the helical spring 68 decompressing and the fluid pressure from the fluid in second inlet 10, central chamber 14 and outlet 16 then impel the valve member 6 towards the first end wall 30 until the valve member reaches its first position (shown in FIG. 7), the first sealing face 50 contacts end wall 30, and a fluid tight seal is formed between those faces.

The material from which the parts of the valve body, valve member and catch are formed or manufactured is, in the illustrated embodiment, a corrosion resistant steel such as a stainless steel. In other embodiments, a steel coated to impart corrosion resistance, brass, an aluminum alloy, or a non-metallic material that is resistant to the fluids proposed to be used in the hydraulic or pneumatic system which is to include the above discussed shuttle valve may be used.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the shuttle valves disclosed in the various embodiments may be used alone, in combination, or in a variety of arrangements not specifically discussed in the embodiments described above. This disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A shuttle valve comprising
a valve body, a valve member, and a catch;
the valve body comprises a first and a second fluid inlet, a central chamber, and a fluid outlet,
 the first and second fluid inlets and the fluid outlet open into the central chamber via a first and a second inlet mouth and an outlet mouth;
 the valve member is configured to move between a first and a second position; in which the valve member closes the first inlet mouth and allows fluid communication between the second inlet mouth and the outlet mouth when the valve member is in the first position;
 the valve member closes the second inlet mouth and allows fluid communication between the first inlet mouth and the outlet mouth when the valve member is in the second position;
 the catch exerts a biasing force against the valve member;
 the valve member and catch are so configured that the catch biasing force biases the valve member to close the first inlet mouth when the valve member is in the first position and to close the second inlet mouth when the valve member is in the second position;
 the catch comprises a biasing means and a pressure ring, and the catch is configured to bias the pressure ring against the valve member; and
 the catch further comprises an internal circlip, the internal circlip and the biasing means are located within the outlet, the biasing means is between the pressure ring and the internal circlip, and the catch is so configured that a portion of the pressure ring extends out of the outlet mouth into the central chamber when the biasing means is in an unenergized condition.

2. The shuttle valve according to claim 1 in which the biasing of the valve member by the catch contributes to the formation of a fluid tight seal between the valve member and the inlet mouth which the valve member is biased towards.

3. The shuttle valve according to claim 1 in which the valve member comprises first and second valve member push faces,
 the catch comprises first and second catch push faces,
the first and second valve member push faces intersect each other at a valve member intersection,
 the first and second catch push faces intersect each other at a catch intersection,
the valve member is so configured that when the valve member is in or close to the first position the first catch push face is in contact with the first valve member push face and the biasing force from the catch is transmitted between the first catch push face and the first valve member push face, and when the valve member is in or close to the second position the second catch push face is in contact with the second valve member push face and the biasing force from the catch is transmitted between the second catch push face and the second valve member push face.

4. The shuttle valve according to claim 1 in which the valve member intersection and catch intersection are so configured that it is probable that the biasing of the catch intersection against the valve member intersection will cause movement of the valve member towards one of the first or second inlet mouths.

5. The shuttle valve according to claim 4 in which the surface profile of the portion of the catch comprising the first and second catch push faces and the catch intersection has, in the direction of movement of the valve member between the first and second positions, the form of one of a V, an inverted V, a U or an inverted U, and the surface profile of the portion of the valve member comprising the first and second valve member push faces and the valve member intersection has, in the direction of movement of the valve member between the first and second positions, the form of the other of a V, an inverted V, a U or an inverted U.

6. The shuttle valve according to claim 1 in which the central chamber is longitudinally extending with a longitudinal central axis (X), the central chamber is defined by a number of longitudinally extending side walls, a first end wall and a second end wall, the first end wall defines the first inlet mouth,
the second end wall defines the second inlet mouth,
a number of the side walls define the outlet mouth and the outlet mouth is spaced from the first and second end walls,
each portion of side wall is, in the longitudinal direction, substantially parallel to the portion of side wall that is on the diametrically opposite side of the longitudinal axis (X),
the valve member further comprises a first and second sealing face and a first and second slide portion,
in which the first and second sealing faces are so configured that when biased against the first and second inlet mouths respectively the first and second sealing faces form a fluid tight seal with a portion of the first and second end walls defining or adjacent to the first and second inlet mouths,
and the first and second slide portions are so configured that they slidingly engage with a portion of at least one side wall when the valve member is at or between the first and second positions.

7. The shuttle valve according to claim 6 in which the first and second slide portions of the valve member extend around the valve member, the first slide portion is in full sliding and sealing contact with each side wall of the central chamber in the portion of the side wall between the outlet mouth and the first end wall when the valve member is in its first position, and the second slide portion is in full sliding and sealing contact with each side wall of the central chamber in the portion of the side wall between the outlet mouth and the second end wall when the valve member is in its second position.

8. The shuttle valve according to claim 6 in which the first and second end walls of the central chamber are conical, the first and second sealing faces of the valve member are conical, the first end wall and first sealing face of the valve member are configured to form a fluid tight seal between them when biased into each other, and the second end wall and second sealing face of the valve member are configured to form a fluid tight seal between them when biased into each other.

9. The shuttle valve according to claim 8 in which the cone angle of the first end wall is different to the cone angle of the first sealing face, and the cone angle of the second end wall is different to the cone angle of the second sealing face.

10. The shuttle valve according to claim 1 in which the valve body comprises a base part and an insert,
in which the base part defines the first inlet, the outlet, the first end wall, the/or each sidewall of the central chamber; and a receiver;
the insert defines the second inlet and the second end wall of the central chamber;
a portion of the insert is dimensioned and configured to be received in the receiver; and
the receiver is dimensioned to allow the valve member to be placed into or removed from the central chamber via the receiver when the insert is not within the receiver.

11. The shuttle valve according to claim 10 in which the receiver is a continuation of the central chamber, and the/or each side wall that defines the central chamber extends into and defines the receiver.

12. The shuttle valve according to claim 1 in which one or more of the valve body or part thereof, valve member, and the catch or part thereof are formed from one of or a combination of a corrosion resistant steel, a steel coated to impart corrosion resistance, brass, a corrosion resistant aluminum alloy, and/or a non-metallic material that is resistant to hydraulic fluids.

13. A hydraulic system for an aircraft comprising at least one shuttle valve according to claim 1.

* * * * *